(12) United States Patent
Liao et al.

(10) Patent No.: US 6,694,417 B1
(45) Date of Patent: Feb. 17, 2004

(54) WRITE PIPELINE AND METHOD OF DATA TRANSFER THAT SEQUENTIALLY ACCUMULATE A PLURALITY OF DATA GRANULES FOR TRANSFER IN ASSOCIATION WITH A SINGLE ADDRESS

(75) Inventors: Yu-Chung Liao, Austin, TX (US); Peter Anthony Sandon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,025

(22) Filed: Apr. 10, 2000

(51) Int. Cl.$^7$ .............................................. G06F 12/02
(52) U.S. Cl. ..................... 711/170; 711/217; 711/118; 711/145; 710/39
(58) Field of Search ................... 711/170, 100, 711/171, 172, 118, 119, 208, 217, 220, 141, 144, 145; 710/39, 24, 9, 52

(56) References Cited

U.S. PATENT DOCUMENTS

| | | | |
|---|---|---|---|
| 4,623,997 A | 11/1986 | Tulpule ...................... 711/141 |
| 4,751,671 A | 6/1988 | Babetski et al. .............. 710/56 |
| 5,247,626 A | 9/1993 | Firoozmand ................ 709/212 |
| 5,295,246 A | 3/1994 | Bischoff et al. .............. 710/34 |
| 5,299,315 A | 3/1994 | Chin et al. .................. 710/110 |
| 5,363,485 A | 11/1994 | Nguyen et al. ............. 710/113 |
| 5,377,332 A | 12/1994 | Entwistle et al. ........... 710/117 |
| 5,469,558 A | 11/1995 | Lieberman et al. ......... 710/105 |
| 5,519,701 A | 5/1996 | Colmant et al. ............. 370/412 |
| 5,781,918 A | 7/1998 | Lieberman et al. ............ 711/5 |
| 5,818,844 A | 10/1998 | Singh et al. ................. 370/463 |
| 5,841,988 A | 11/1998 | Chennubhotla et al. ..... 709/237 |
| 5,901,295 A | 5/1999 | Yazdy ......................... 710/113 |
| 5,961,640 A | 10/1999 | Chambers et al. .......... 712/300 |
| 5,963,981 A * | 10/1999 | Martin ........................ 711/170 |
| 6,016,315 A | 1/2000 | Chambers et al. .......... 370/378 |
| 6,219,745 B1 * | 4/2001 | Strongin et al. ............. 711/100 |
| 6,351,790 B1 * | 2/2002 | Jones .......................... 711/141 |
| 6,415,362 B1 * | 7/2002 | Hardage et al. ............. 711/142 |
| 6,615,321 B2 * | 9/2003 | Arimilli et al. .............. 711/141 |

* cited by examiner

*Primary Examiner*—Pierre-Michel Bataille
(74) *Attorney, Agent, or Firm*—Richard A. Henkler; Bracewell & Patterson, L.L.P.

(57) ABSTRACT

A data processing system may include an interconnect and first and second components coupled to the interconnect for data transfer therebetween. The first component contains a write pipeline that includes an address register and a queue including storage locations for a plurality of data granules. In response to receipt of a plurality of data granules that are each associated with a single address specified by the address register, the queue loads the plurality of data granules into sequential storage locations in order of receipt. Upon the queue being filled with a predetermined number of data granules, the queue outputs, to the second component via the interconnect, the predetermined number of data granules at least two at a time according to the order of receipt. Thus, data transfer efficiency is enhanced while maintaining the relative ordering of the data granules.

16 Claims, 3 Drawing Sheets

WRITE PIPELINE AND METHOD OF DATA TRANSFER THAT SEQUENTIALLY ACCUMULATE A PLURALITY OF DATA GRANULES FOR TRANSFER IN ASSOCIATION WITH A SINGLE ADDRESS

BACKGROUND OF THE INVENTION

1. Technical Field

The present invention relates in general to data processing and, in particular, to efficient data transfer in a data processing system. Still more particularly, the present invention relates to a write pipeline utilized to sequentially accumulate a plurality of data granules for transfer in association with a single address.

2. Description of the Related Art

It has been recognized in the art that the overall performance of conventional data processing systems depends not only upon the individual performance of the constituent components of the data processing system, but also upon the efficiency of data transfer between the components. For example, in a conventional data processing system including a processor and a memory system, many strategies have been proposed and implemented in order to improve the efficiency of data transfer between the processor and the memory system. One such strategy is referred to as store gathering.

Store gathering typically refers to a strategy of data transfer from the processor to the memory system in which the processor is equipped with a store gathering buffer that collects data associated with a number of smaller (e.g., two byte) store operations associated with multiple memory addresses in a defined address range and then outputs all of the collected data in a single larger (e.g., eight byte) store operation. Conventional store gathering has the advantage of reducing the number of data tenures utilized to store a given number of data bytes by utilizing the full bandwidth of the data portion of the interconnect. Store gathering buffers tend, however, to be quite complex to implement in that the store gathering buffer must be able to handle operating scenarios in which addresses of incoming store operations partially or fully overlap, too few store operations in a given address range are received to utilize the full bandwidth of the data interconnect, buffer full conditions, etc. Because of this complexity, store gathering buffers are expensive to implement and consume a large amount of chip area.

Another characteristic of conventional store gathering buffers is that they do not preserve the ordering of incoming store operations. That is, after the smaller store operations are gathered in the buffer and transferred to a memory system (or other recipient), the order in which the smaller store operations were received by the store gathering buffer cannot be determined by the recipient from the larger gathered store operation. Thus, conventional store gathering buffers cannot be employed in data processing applications in which data transfer is order-sensitive.

SUMMARY OF THE INVENTION

The shortcomings and disadvantages of conventional store gathering buffers described above are addressed and overcome by the write pipeline and method of data transfer introduced by the present invention.

According to the present invention, an exemplary data processing system may include an interconnect and first and second components coupled to the interconnect for data transfer therebetween. The first component contains a write pipeline that includes an address register and a queue having storage locations for a plurality of data granules. In response to receipt of a plurality of data granules that are each associated with a single address specified by the address register, the queue loads the plurality of data granules into sequential storage locations in order of receipt. Upon the queue being filled with a predetermined number of data granules, the queue outputs, to the second component via the interconnect, the predetermined number of data granules at least two at a time according to the order of receipt. In a preferred embodiment, the queue is implemented as a circular first-in, first-out (FIFO) queue. Thus, data transfer efficiency is enhanced utilizing a simple queue structure while maintaining the input ordering of the data granules.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
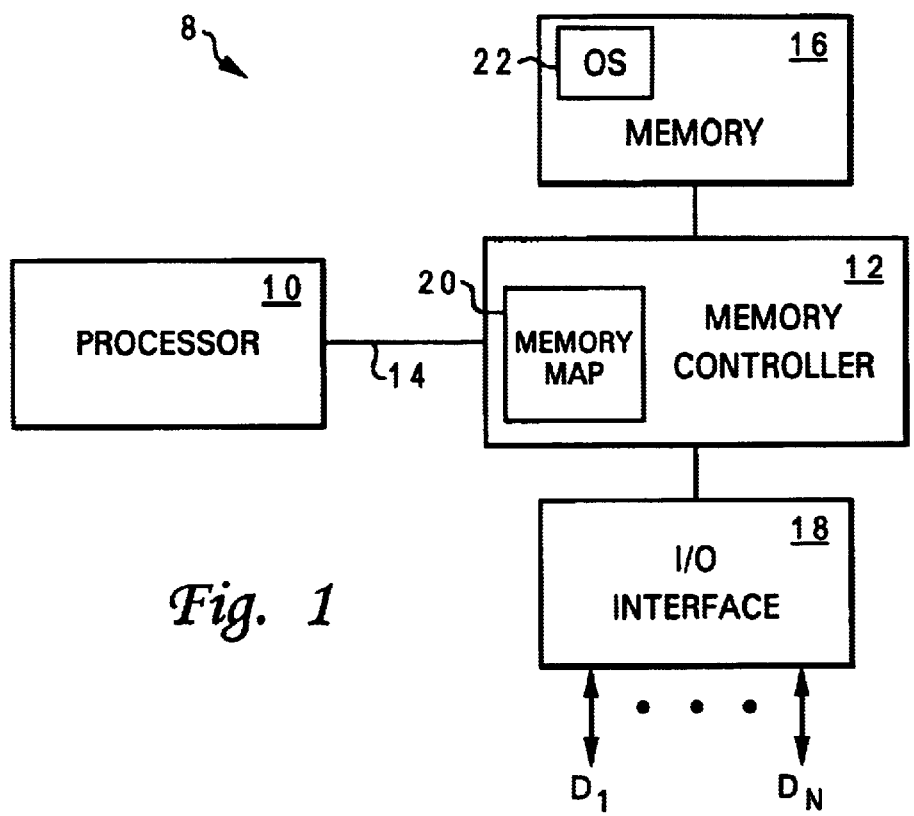
FIG. 1 depicts an illustrative embodiment of a data processing system with which the method and system of the present invention may advantageously be utilized.

With reference now to the figures and in particular with reference to FIG. 1, there is depicted a block diagram of an exemplary embodiment of a data processing system 8 in accordance with the present invention. Data processing system 8 may comprise either of a general purpose data processing system, such as a desktop or workstation computer system, or a special purpose data processing system, such as an electronic gaming system, personal digital assistant (PDA), mobile telephone, etc.

As shown, data processing system 8 includes a processor 10 and a memory controller 12 that are each coupled to an interconnect 14. Interconnect 10 may be a conventional bus including data, address and control lines, a switch fabric, or any other type of interconnect. Memory controller 12 is in turn coupled to a memory 16 that provides volatile and/or non-volatile data storage and an input/output (I/O) interface 18 that provides connections for a number of I/O devices $D_1$–$D_N$. Of course, depending upon its intended application, data processing system 8 may include any number of other useful or necessary components that are not relevant to an understanding of the present invention and are accordingly omitted from FIG. 1.

In operation, processor 10 issues read requests on interconnect 14 to obtain data (including instructions) from memory controller 12 and issues write requests on interconnect 14 to supply data to memory controller 12. Each of these read and write requests typically includes at least one address. In order to service such read and write requests, memory controller 12 preferably maintains a memory map 20 that records the allocation (e.g., by operating system (OS) 22) of certain addresses to storage locations in memory 16 and other addresses to the various I/O devices $D_1$–$D_N$ interfaced by I/O interface 18. Memory controller 12 thus utilizes memory map 20 to read data from or write data to the appropriate storage location in memory 16 or the appropriate I/O device $D_1$–$D_N$ for an address specified by processor 10.

According to a preferred embodiment of the present invention, at least some write requests by processor 10 are order-sensitive, meaning that for proper operation of data processing system 8, the storage location in memory 16 or I/O device specified by the address in such order-sensitive write requests must receive data from memory controller 12 in the order determined by processor 10. Memory controller 12 therefore services at least some, and preferably all, write requests in an order-sensitive manner.

Figure 2:
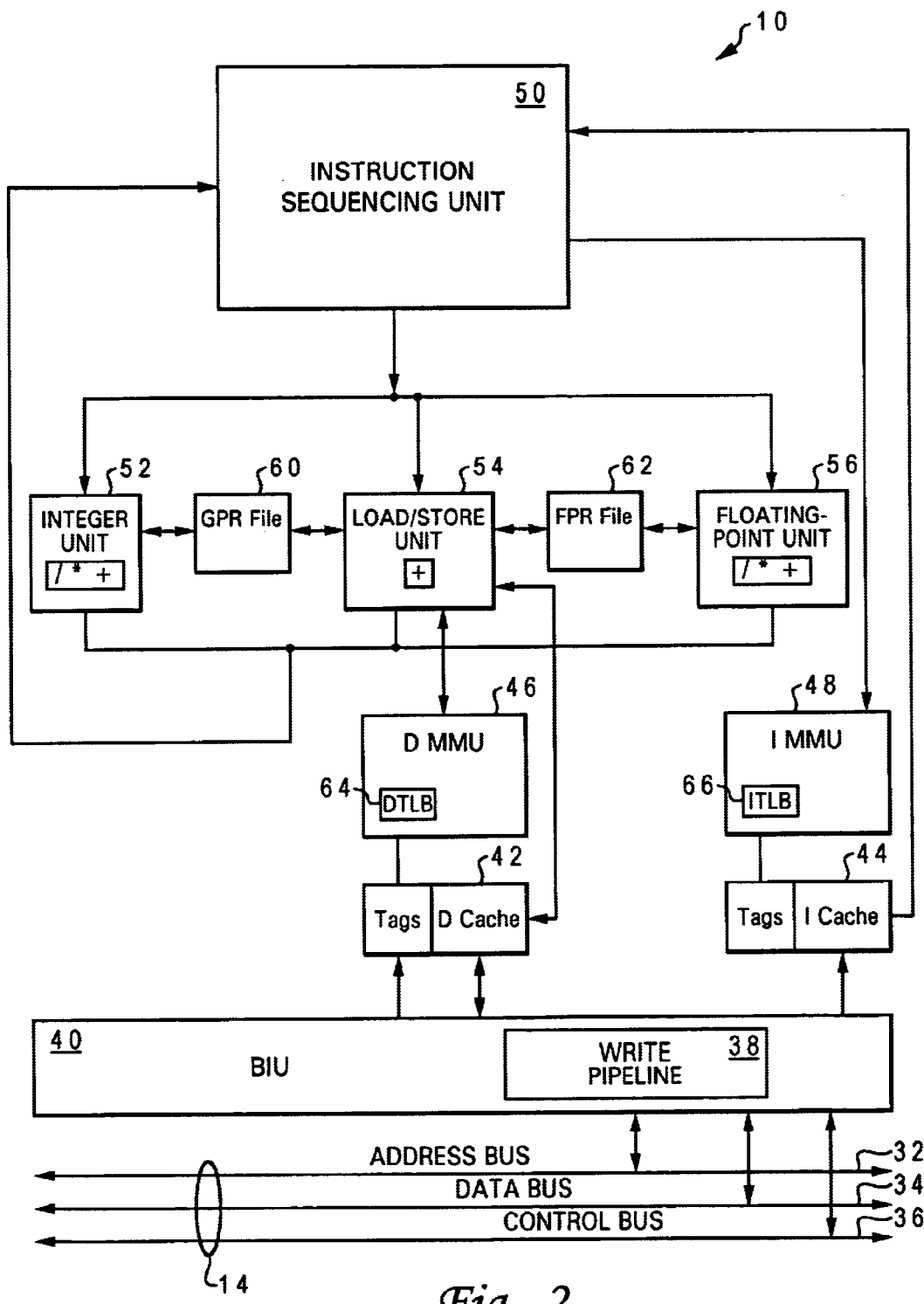
FIG. 2 is a more detailed block diagram of the processor of FIG. 1.

Referring now to FIG. 2, a more detailed block diagram of an illustrative embodiment of a processor 10 in data processing system 8 is illustrated. In the depicted illustrative embodiment, processor 10 comprises a single integrated circuit superscalar microprocessor including various execution units, registers, buffers, memories, and other functional units, which are all formed by integrated circuitry. Processor 10 may comprise, for example, one of the PowerPC™ line of microprocessors available from International Business Machines (IBM) Corporation of Armonk, N.Y., which operates according to reduced instruction set computing (RISC) techniques; however, those skilled in the art will appreciate from the following description that other suitable processors, such as Intel Pentium™ processors, can alternatively be utilized.

As illustrated in FIG. 2, processor 10 is coupled, via a bus interface unit (BIU) 40, to interconnect 16, which in the depicted embodiment includes address, data, and control buses 32, 34 and 36. BIU 40 manages the transfer of information between processor 10 and other devices coupled to interconnect 16, such as memory controller 12. In accordance with the present invention and as described in detail below with respect to FIGS. 3 and 4, outgoing data may advantageously be accumulated by a write pipeline 38 in order to maximize the utilization of the bandwidth of data bus 34 while supporting order-sensitive data transfer.

BIU 40 is further connected to a cache subsystem, which in the illustrated embodiment includes separate data and instruction caches 42 and 44. On-chip caches 42 and 44 enable processor 10 to achieve relatively fast access times to a subset of data or instructions previously transferred from memory controller 12 to the caches, thus improving processing efficiency. Data and instructions stored within caches 42 and 44 are identified and accessed by address tags, which each comprise a selected number of high-order bits of the physical address of the data or instructions. Because processor 10 references data and instructions by effective addresses not physical addresses, in order for processor 10 to access data and instructions within caches 42 and 44, data memory management unit (DMMU) 46 and instruction memory management unit (IMMU) 48 translate the effective addresses of data and instructions, respectively, into physical addresses that are supplied to caches 42 and 44.

In the depicted embodiment, address translation is preferably performed by reference to Page Table Entries (PTEs) cached in data translation lookaside buffer (DTLB) 64 and instruction TLB (ITLB) 66. In addition to fields associating the effective address of a particular (e.g., 4 Kbyte) memory page with the corresponding physical address, each PTE preferably includes other fields, such as a page protection field, page history field, and a memory access field, describing attributes of the memory page. The memory access field, which in the PowerPC™ architecture includes the W (write-through), I (caching-inhibited), M (memory coherency) and G (guarded) bits, instructs processor 10 how to handle memory operations resulting from the execution of load and store instructions. In particular, the I bit indicates whether or not data or instructions in the associated memory page is cacheable in data cache 42 or instruction cache 44. Further information on PTEs and the WIMG bits may be found, for example, in IBM, *The PowerPC Architecture—A Specification for a New Family of RISC Processors*, Morgan Kaufmann Publishers, August 1994 (ISBN 1-55860-316-6) and *PowerPC™ 603 RISC Microprocessor User's Manual* (IBM Microelectronics Order No. MPR603UMU-01), which are both incorporated herein by reference.

Instruction cache 44 and IMMU 48 are further coupled to instruction sequencing unit 50, which fetches instructions for execution from instruction cache 44 utilizing addresses translated by IMMU 48. Instruction sequencing unit (ISU) 50 processes branch instructions internally and temporarily buffers sequential (non-branch) instructions until execution resources for the sequential instructions are available. In the depicted illustrative embodiment, the sequential execution resources of processor 10 include at least one integer unit (IU) 52, load-store unit (LSU) 54, and floating-point unit (FPU) 56. Each of execution units 52–56 typically executes one or more instructions of a particular type of sequential instructions during each processor cycle, which generally entails obtaining data from or storing data to one of general purpose register (GPR) file 62 and floating-point register (FPR) file 62. Once an execution unit 52, 54 or 56 finishes executing an instruction, that execution unit notifies ISU 50, which directs completion of the instruction and writeback of instruction results, if required.

Figure 3:
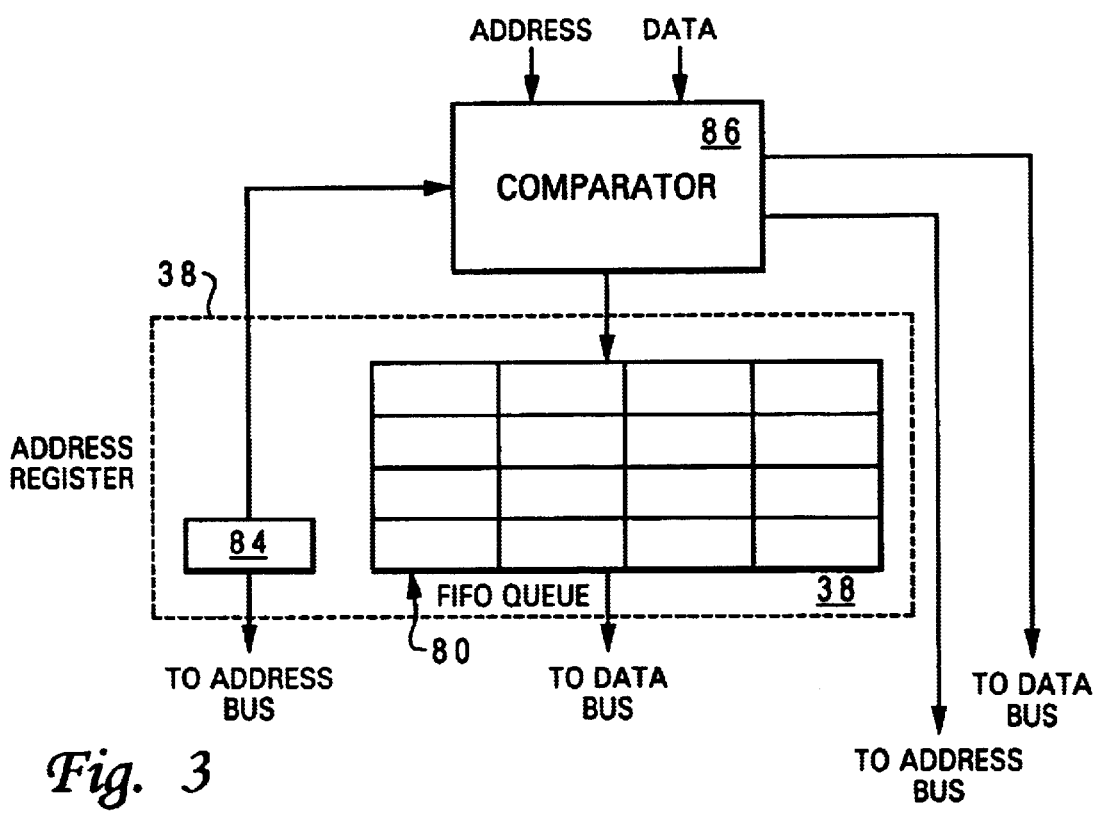
FIG. 3 depicts an exemplary embodiment of a write pipeline in accordance with a preferred embodiment of the present invention.

With reference now to FIG. 3, there is depicted a block diagram of an exemplary embodiment of write pipeline 38 of FIG. 2 together with associated circuitry. As illustrated, write pipeline 38 includes a circular first-in, first-out (FIFO) queue 80 providing order-sensitive storage for a plurality of data bytes. For example, in the embodiment depicted in FIG. 3, queue 80 has a capacity of 128 bytes, a maximum fill rate of 8 bytes per cycle, a minimum data granule input size of 1 byte, and a drain rate of at least two bytes (and preferably 8 bytes) per cycle. Associated with queue 80 is an address register 84, which is preferably software readable and writable. Address register 84 holds a single (e.g., 32-bit) address that is associated with all data in queue 80.

Many physical implementations of write pipeline 38 are possible. For example, loading data into queue 80 and transferring data out of queue 80 may be managed utilizing "head" and "tail" pointers, as is known in the art, or some other queue management technique. In addition, address register 84 need not be physically located within BIU 40, but could also be implemented as a special-purpose register located elsewhere in processor 10 or as a GPR within GPR file 60 that is associated with queue 80 by an instruction.

A comparator 86 is coupled to both address register 84 and queue 80. Comparator 86 determines whether to accumulate output data in queue 80 by comparing the address associated with the output data with the contents of the address register 84. If the addresses match, the data are appended to the "tail" of the data bytes already residing in queue 80, if any. If queue 80 is full, the store operation is preferably held off until room becomes available in queue 80 through a data transfer. Alternatively, if comparator 36 determines that the addresses do not match, queue 80 is bypassed, and the address and data are output onto address bus 32 and data bus 34, respectively, as soon as BIU 40 obtains ownership of interconnect 14.

Figure 4:
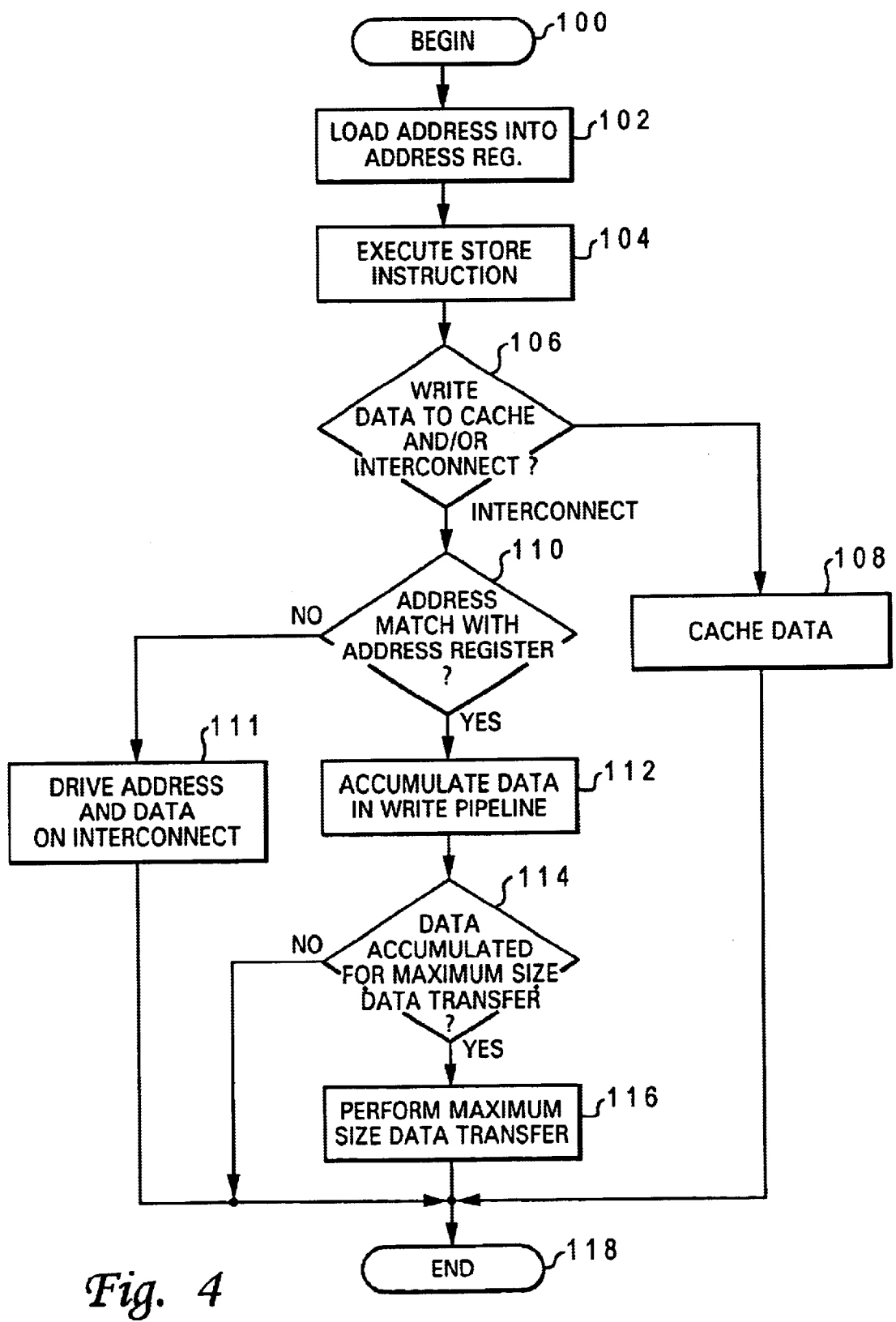
FIG. 4 is a high level flowchart of a method of utilizing a write pipeline to effect efficient data transfer in accordance with the present invention.

Referring now to FIG. 4, there is illustrated an exemplary embodiment of a method of transferring data in a data processing system utilizing a write pipeline in accordance with the present invention. The process begins at block 100 and thereafter proceeds to block 102, which depicts loading a single address into an address register 84, for example, by executing a first store instruction in LSU 54. This address is preferably translated from an effective address to a physical address prior to storage in address register 84. Next, as illustrated at block 104, a second store instruction is executed in LSU 54. Execution of the second store instruction (1) produces an effective address that is the target address of a store operation and (2) identifies one or registers in register file 60 or register file 62 that contain the data to be written to the target effective address.

A determination is then made at block 106 whether the data is to be written to data cache 42 and/or interconnect 14 to perform the store operation specified by the second store instruction executed at block 104. For the processor depicted in FIG. 2, the determination shown at block 106 is preferably made by DMMU 46 concurrently with address translation by reference to the WIMG bits in the memory access field of the appropriate PTE. If neither the W nor I bit is set, the data is only written to data cache 42; if, however, the I bit is set, caching is inhibited, and the data is only output onto interconnect 14, possibly after accumulation with other data by write pipeline 38 as discussed further below. (Other settings of the WIMG bits may cause processor 10 to both cache data and output the data on interconnect 14.) In response to a determination that the data specified by the store instruction is to be cached, the data is written from the identified registers into data cache 42, as illustrated at block 108. Thereafter, the process terminates at block 118.

Referring again to block 106 of FIG. 4, if a determination is made that the data specified by the store instruction is to be output on interconnect 14, comparator 86 of BIU 40 then determines at block 110 whether the target address of the store operation matches the single address in the address register 84. If not, the store data and target address are immediately driven on data bus 34 and address bus 32, respectively (i.e., as soon as BIU 40 can obtain ownership of buses 32 and 34 according to the implemented arbitration scheme). However, if comparator 86 determines at block 110 that the target address of the store operation matches the address contained in the address register 84, then the store data is appended to the other data, if any, residing in queue 80, thereby permitting accumulation of a data transfer of maximum size.

If the addition of the store data to queue 80 does not result in the accumulation of enough data for a maximum size data transfer as defined by the architecture of interconnect 14, then the process ends at block 118 until the execution of a subsequent store instruction, in which case the process returns to block 104, which is described above. On the other hand, if the addition of the store data to queue 80 results in accumulation of enough data for a maximum size data transfer, queue 80 initiates a maximum size data transfer on interconnect 14. The number of data bytes in the data transfer and the number of data tenures on data bus 34 depends upon the data bandwidth and architectural definition of interconnect 14. Although the number of data tenures may vary between implementations, each data tenure preferably includes multiple (i.e., at least two) granules (e.g., bytes) of data, with the relative ordering of the data bytes in each beat being architecturally defined. Importantly, each data tenure on data bus 34 is associated with the single address specified in address register 84, which is driven on address bus 32 for one or more address tenures. In an exemplary embodiment, data bus 34 is 8 bytes wide and the architecturally defined maximum transfer size is 32 bytes. Thus, the data transfer requires 4 tenures (beats) on data bus 34. Interconnect 14 preferably supports a burst mode of operation in which the four 8-byte beats of data can be driven on data bus 34 in four consecutive bus cycles in association with a single address tenure on address bus 32. Following block 116, the process shown in FIG. 4 terminates at block 118.

In response to receipt of the data transfer by memory controller 12, memory controller 12 determines by reference to memory map 20 whether the single target address is associated with a location in memory 16 or an I/O device. Memory controller 12 then supplies the store data to the target device in the order of receipt and in accordance with the architecturally-defined byte order. Thus, the order in which the store data was received at queue 80 is the order in which the received by the target device.

As has been described, the present invention provides a write pipeline including a circular order-sensitive queue. The write pipeline permits the accumulation of data associated with a single address to allow maximum utilization of the data bandwidth of an interconnect, while also maintaining the input ordering of the accumulated data.

While the invention has been particularly shown and described with reference to a preferred embodiment, it will be understood by those skilled in the art that various changes in form and detail may be made therein without departing from the spirit and scope of the invention. For example, although the present invention has been described with respect to FIFO ordering of output data, it should be understood that last-in, first-out (LIFO) or other types of order-sensitive data transfer could be implemented by a write pipeline in accordance with the present invention.

What is claimed is:

1. A processor comprising:

a cache;

a memory management unit that records storage attributes in association with address ranges; and an interface unit including a write pipeline, wherein said interface unit selectively utilizes said write pipeline to output data granules onto an interconnect in response to storage attributes within said memory management unit associated with an address range including a single address, wherein said write pipeline includes:

an address register that specifies said single address; and a queue including storage locations for a plurality of data granules, wherein said queue, responsive to receipt of a plurality of data granules each associated with the single address specified by said address register, loads said plurality of data granules into sequential storage locations of said queue in order of receipt of said data granules, and wherein said queue, upon containing therein a predetermined amount of data granules, outputs said predetermined amount of data granules on the interconnect at least two at a time according to said order of receipt.

2. The processor of claim 1, wherein said queue comprises a first-in, first-out (FIFO) queue that outputs data granules in said order of receipt.

3. The processor of claim 1, wherein said queue outputs all of said predetermined amount of data granules in association with said single address in said address register.

4. The processor of claim 3, wherein said queue is coupled in an interconnect including data lines and address lines, and wherein said queue outputs said data granules on the data lines in multiple data tenures that are each associated with said single address placed on said address lines.

5. The processor of claim 4, wherein said predetermined amount of data granules comprises a maximum data transfer size of said interconnect.

6. A data processing system, comprising:
    an interconnect;
    a processor and a second component that are each coupled to said interconnect for data transfer there between, said processor including a cache, a memory management unit that records storage attributes in association with address ranges, and an interface unit including a write pipeline, wherein said interface unit selectively utilizes said write pipeline to output data granules onto said interconnect in response to storage attributes associated with an address range including said single address, said write pipeline including:
        an address register; and
        a queue including storage locations for a plurality of data granules, wherein said queue, responsive to receipt of a plurality of data granules each associated with a single address specified by said address register, loads said plurality of data granules into sequential storage locations of said queue in order of receipt of said data granules, and wherein said queue, upon said queue containing a predetermined amount of data granules, outputs said predetermined amount of data granules at least two at a time according to said order of receipt.

7. The data processing system of claim 6, wherein said queue comprises a first-in, first-out (FIFO) queue that outputs data granules in said order of receipt.

8. The data processing system of claim 6, wherein said queue outputs all of said predetermined amount of data granules in association with said single address in said address register.

9. The data processing system of claim 8, said interconnect including data lines and address lines, wherein said queue outputs said data granules on the data lines in multiple data tenures that are each associated with said single address placed on said address lines.

10. The data processing system of claim 9, wherein said predetermined amount comprises a maximum data transfer size of said interconnect.

11. The data processing system of claim 6, wherein said second component comprises a memory controller.

12. A method of data transfer in a data processing system having a processor, a second component and an interconnect, wherein said processor includes a cache, an address register, a queue, and a memory management unit, said method comprising:
    storing a single address in the address register of the processor;
    within the memory management unit, recording storage attributes in association with address ranges;
    the processor determining whether or not to output data granules on said interconnect via said queue by reference to storage attributes in said memory management unit associated with an address range including said single address;
    in response to receipt of a plurality of data granules at the queue that are each associated with a single address specified by said address register, storing said plurality of data granules into sequential storage locations in said queue in order of receipt of said data granules; and
    in response to said queue being filled with a predetermined amount of data granules, the queue outputting, to said second component via said interconnect, said predetermined amount of data granules at least two at a time according to said order of receipt of said data granules.

13. The method of claim 12, wherein outputting said predetermined amount of data granules comprises outputting said predetermined amount of data granules in first-in, first-out (FIFO) order.

14. The method of claim 12, wherein outputting said predetermined amount of data granules comprises outputting all of said predetermined amount of data granules in association with said single address in said address register.

15. The method of claim 14, wherein the interconnect includes data lines and address lines, and wherein outputting said predetermined amount of said data granules further comprises:
    outputting said single address on the address lines; and
    outputting said predetermined amount of data granules on the data lines in multiple data tenures that are each associated with said single address placed on said address lines.

16. The method of claim 12, wherein outputting said predetermined amount of data granules comprises outputting a maximum size data transfer permitted by the interconnect.

* * * * *